United States Patent [19]

Jürgens

[11] Patent Number: 4,942,785

[45] Date of Patent: Jul. 24, 1990

[54] ARRANGEMENT FOR AN AUTOMATIC SHIFTING OF AN EPICYCLIC, SHIFTABLE TRANSMISSION OF A MOTOR VEHICLE

[75] Inventor: Gunter Jürgens, Waiblingen, Fed. Rep. of Germany

[73] Assignee: Daimler-Benz AG, Fed. Rep. of Germany

[21] Appl. No.: 277,973

[22] Filed: Nov. 30, 1988

[30] Foreign Application Priority Data

Dec. 2, 1987 [DE] Fed. Rep. of Germany ....... 3740781

[51] Int. Cl.⁵ ............................................. B60K 41/06
[52] U.S. Cl. ........................................ 74/867; 74/861
[58] Field of Search ...................... 74/867, 868, 752 C, 74/861

[56] References Cited

U.S. PATENT DOCUMENTS

| | | | |
|---|---|---|---|
| 3,483,771 | 6/1966 | Förster et al. ......................... | 74/759 |
| 4,254,672 | 3/1981 | Mizuno et al. ...................... | 74/867 X |
| 4,420,994 | 12/1983 | Muller et al. ......................... | 74/867 |
| 4,438,666 | 3/1984 | Lane ....................................... | 74/868 |
| 4,495,838 | 1/1985 | Gooch ............................... | 74/861 X |
| 4,495,839 | 1/1985 | Morscheck ......................... | 74/868 X |
| 4,555,959 | 12/1985 | Braun ................................. | 74/868 X |

OTHER PUBLICATIONS

Functional Description Automatic Transmission, Daimler-Benz AG, Stuttgart-Vntertürkheim Zentralkundendienst

*Primary Examiner*—Dwight Diehl
*Attorney, Agent, or Firm*—Evenson, Wands, Edwards, Lenahan & McKeown

[57] ABSTRACT

In an arrangement for the automatic shifting of an epicyclic speed change transmission, a relatively quickly performed smooth selection operation in starting is achieved by the speed change transmission taking the form of a group gear divided into two transmission sections. In a first selection phase, the one transmission section is stalled with uncoupling from the drive motor and the transmission section connected to the output shaft is held in the driveless state. On reaching the stalled state, the torque transmissibility between the drive motor and output shaft is restored with a smooth flat rise beginning from zero, by pressure control in the shift actuators concerned.

9 Claims, 2 Drawing Sheets

|   | K4 | K3 | K1 | B1 | B3 | B2 | K2 |
|---|----|----|----|----|----|----|----|
| 5 | ●  |    |    | ●  |    |    | ●  |
| 4 | ●  | ●  |    |    |    |    | ●  |
| 3 | ●  | ●  |    |    |    | ●  |    |
| 2 |    | ●  |    | ●  |    | ●  |    |
| 1 |    | ●  |    |    | ●  | ●  |    |
| N |    | ◓  | ◓  |    | ●  | ◓  |    |
| R |    |    | ●  |    | ●  | ●  |    |

ARRANGEMENT FOR AN AUTOMATIC SHIFTING OF AN EPICYCLIC, SHIFTABLE TRANSMISSION OF A MOTOR VEHICLE

BACKGROUND AND SUMMARY OF THE INVENTION

The present invention generally relates to an arrangement for the automatic shifting of an epicyclic speed-change transmission, and more particularly to an arrangement which ensures a smooth, relatively short gear engagement operation.

In a known arrangement of this type, as disclosed by German Patent Specification No. 1 530 584, corresponding to U.S. Pat. No. 3,483,771, the entire disclosure of which is herein incorporated by reference, a two part transmission has a first transmission section, which can be bought into drive connection with the input shaft, and which consists of a linkage, in which two single-carrier epicyclic transmissions are interconnected by two coupling shafts. The second transmission section, which can be brought into drive connection with the output shaft, consists of a single-carrier epicyclic transmission, in which one transmission element of the second transmission section is connected in a torsionally rigid manner to one of the coupling shafts of the first transmission and another transmission element of the second transmission section is connected, by a one-way clutch, to the other coupling shaft of the first transmission section, or in a variant to a non-coupled transmission element of the first transmission section. The one-way clutch engages in first gear and in reverse gear, and then represents a second rigid connection between the two transmission sections in tractive operation. In this known arrangement, although only two shifting means are necessary for forming, in each case, one of the four forward gears and the reverse gear, with only one of the two shifting means changing during a gear shift, there are still also difficulties with the known arrangement during the engagement operation, i.e., when preselecting a gear in the neutral position.

Thus, two things have to be taken into consideration in the engagement operation mentioned.

First, due to the high supporting torques in the forward and reverse gear brakes, the filling time of the fluid actuated shift actuators of the transmission involved in each case during the engagement operation is relatively long.

Second, a cardan shaft torque results from the delay of the turbine impeller mass when using a hydrodynamic torque converter and the proportionate motor masses or remaining transmission masses, in addition to the creeping torque of the torque converter. In other words, this shift actuator filling time period must be correspondingly long in order that the change in torque per unit of time (jerk) does not become too great.

Accordingly, an object of the present invention is to provide an arrangement for the automatic shifting of an epicyclic, shiftable transmission which ensures a short engagement operation with good comfort.

In an embodiment according to the present invention, two transmission sections of a two part transmission operate together, at least in starting gear and, if appropriate, in reverse gear, in the manner of a group gear, because the first and second transmission sections are only interconnected by a single constant torsionally rigid drive connection. As a result, and due to the provision of gradually increasing engagement phases during the preselection of a gear, according to the invention, it is achieved that the mass delay of the drive motor, of the turbine impeller and of the connected transmission and shift elements does not act on the cardan shaft during the engagement operation. Consequently, the engagement operation can only be perceived as a smooth progression from an output torque equal to zero up to an output torque equal to the creeping torque. The engagement operation thus takes place in a considerably shorter time and with good comfort.

In an embodiment according to the present invention, the engagement operation proceeds in such a way that the shift elements for the starting gear, for example, first gear, and for reverse gear are already applied during motor starting in selection position P (parking position) and N (neutral position) of the shift mechanism, but in such a way that the turbine speed of the torque converter is still scarcely reduced. This has the advantage that the drive motor no longer has to inject fuel and thus fuel consumption is not increased. The shift elements of the rear transmission section are either applied only gently or not at all, so that no torque can be transmitted.

When engaging selection position R (reverse gear) or D (complete shift range of all forward gears), the working pressure of pressure-medium actuators of frictional shift elements of the transmission (clutches, brakes) is spontaneously increased, so that the forward transmission section blocks and the turbine speed of the hydrodynamic torque converter is drawn to zero. At the same time, at this moment at the latest, the fluid actuated shift elements of the rear transmission section are applied and, if the turbine speed in the front transmission section becomes zero, then the shift elements of the rear transmission section also fully engage. The shift element of the front transmission section which is not required for the starting gear (for example, a shifting clutch bringing the input shaft into connection in reverse gear with a transmission element of the front transmission section) is released under control, so that the output torque can rise gently to the level of the creeping torque. It is also possible for this process not to take place until the foot brake is released or the accelerator pedal is dabbed.

In a variant embodiment within the scope of the present invention, the engagement operation may also take place in such a way that, as soon as the turbine speed has become zero after the shift elements of the front transmission section have engaged, the unrequired shift element of the front transmission section is abruptly released and the already applied fluid actuated shift element of the rear transmission section is increased gently to the supporting torque of the creeping torque.

The invention can also be used in the same way when the vehicle is in motion. Similarly, the invention may also be used, depending on the cutting in of the shift element of the rear transmission section, as a hill support.

Other objects, advantages and novel features of the present invention will become apparent from the following detailed description of the invention when considered in conjunction with the accompanying drawings.

DETAILED DESCRIPTION OF THE DRAWINGS

Figure 1:
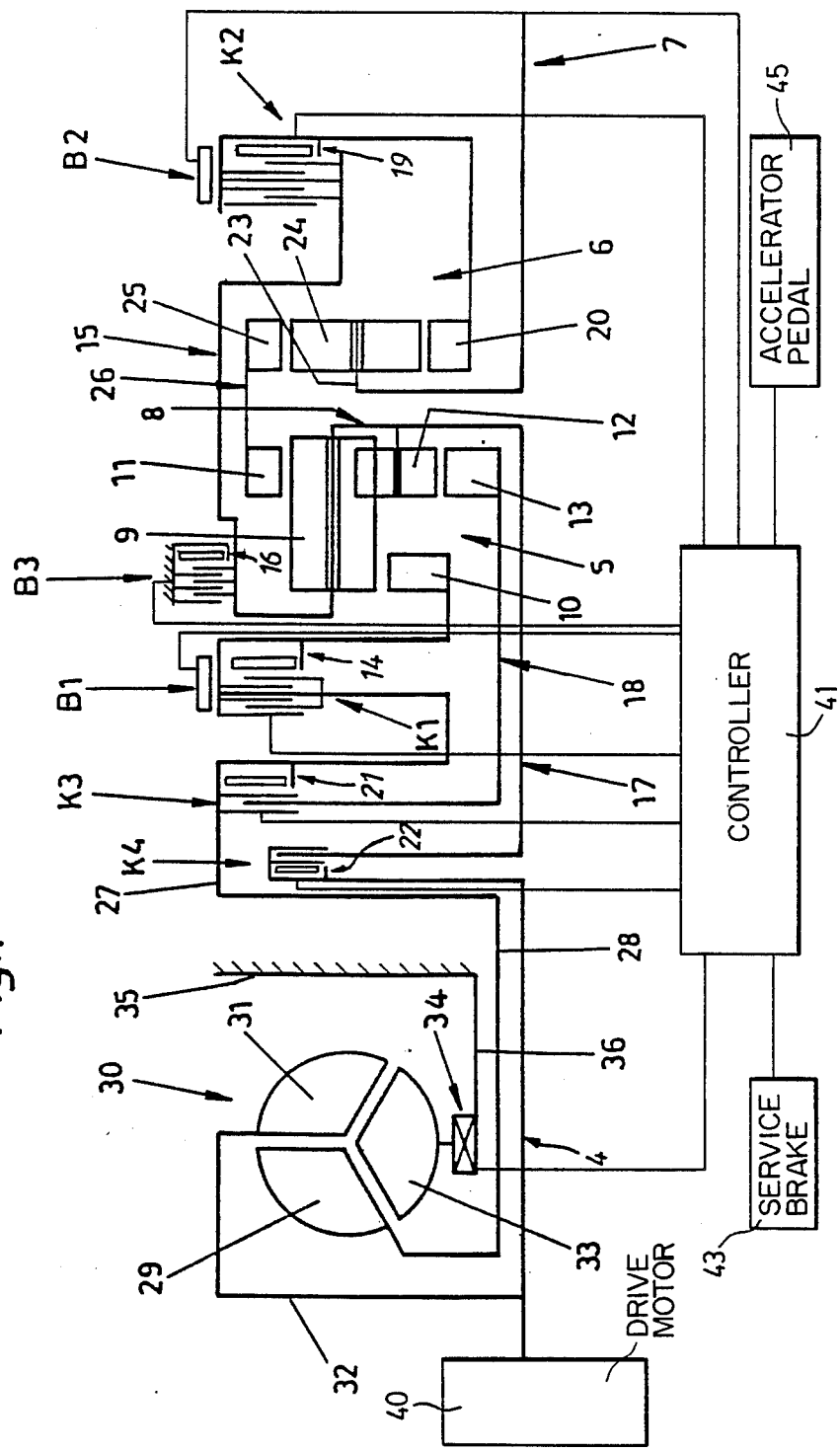
FIG. 1 shows a transmission diagram of an epicyclic speed-change transmission in accordance with the present invention having two transmission sections of auxiliary type.

A shiftable, speed-change transmission shown in FIG. 1 has a first transmission section 5 in the form of a Ravigneaux transmission and a second transmission section 6 in the form of a single carrier epicyclic transmission. The two transmission sections 5 and 6 each have an outer central gear wheel 11 and 25, respectively, which are constantly interconnected in a torsionally rigid manner by a coupling shaft 26 which, for example, is in the form of a drive drum. This coupling shaft 26, in accordance with the present invention, represents the only constant torsionally rigid drive connection between the two transmission sections 5 and 6, so that the shiftable transmission forms a group gear.

The first or front transmission section 5 has a double planet carrier 8, on which intermeshing main and secondary planet gear wheels 9 and 12 are rotatably mounted. The main plane gear wheels 9 mesh, furthermore, both with the outer central gear wheel 11, which is connected to the second transmission section 6 by shaft 26 and with a larger inner central gear wheel 10. The central gear wheel 10 can be stalled by a fluid actuated frictional shift element such as shifting brake in the form of, for example, a band brake B1, which can be engaged and disengaged in the usual way by a pressure medium shift actuator. Further, the central wheel 10 can also be coupled to a drive drum 27 by a fluid actuated frictional shift element such as a shifting clutch K1, which can be operated by a pressure medium shift actuator 14. The drive drum 27 is connected in a torsionally rigid manner to a turbine impeller shaft 28 of a hydrodynamic torque converter 30. The planet carrier 8 is connected in a torsionally rigid manner to a drive drum 15, which reaches concentrically over the coupling shaft 26 and can be stalled by a shifting brake in the form of, for example, a disc brake B3, which can be operated by a pressure medium shift actuator 16. Further, the planet carrier 8 can be coupled to an inner central gear wheel 20 of the rear transmission section 6 by a shifting clutch K2, which can be operated by a pressure medium shift actuator 19. The secondary planet gear wheels 12 mesh with a smaller inner central gear wheel 13, which is connected in a torsionally rigid manner to an input shaft 18 in the form of a hollow shaft 18.

The input shaft 18 can be coupled to the drive drum 27, and thus to the turbine impeller shaft 28, by a shifting clutch K3, which can be operated by a pressure medium shift actuator 21. The planet carrier 8 is, furthermore, connected in a torsionally rigid manner to a central input shaft 17, which can be coupled to a drive shaft 4, passing through the hollow turbine impeller shaft 28, by shifting clutch K4, which can be operated by a pressure medium shift actuator 22. The drive shaft 4, which can be driven directly by a drive motor 40 in a way not shown in any further detail, is connected in a torsionally rigid manner to a pump impeller 31 of the torque converter 30 by a converter bell 32. While the turbine impeller shaft 28 is connected in a torsionally rigid manner to a turbine impeller 29 of the torque converter 30, a guide wheel 33 of the torque converter 30 bears rigidly against a stator shaft 36 via a one-way clutch 34 counter to the direction of drive rotation, the stator shaft 36 being fixed on a housing wall 35 of the transmission housing or converter housing.

Control of the various transmission elements of the transmission is facilitated by a controller 41 having a plurality of fluid conduits connecting the controller 41 and the various clutches and brakes of the transmission. The controller 41 is also connected to a service brake 43 and an accelerator pedal 45 and controls the transmission as further described below with particular reference is FIGS. 2 and 3.

In the case of the rear transmission section 6, inner and outer central gear wheels 20 and 25, respectively, mesh with planet gear wheels 24, which are mounted rotatably on a planet carrier 23. The planet carrier 23 is connected in a torsionally rigid manner to an output shaft 7, which is used in a usual way for the driving of vehicle wheels. Finally, the inner central gear wheel 20 of the rear transmission section 6 can also be stalled by a shifting brake in the form of, for example, a band brake B2, which can be operated in a known way, but not shown in any more detail, by a pressure medium shift actuator.

Figures 2, 3:
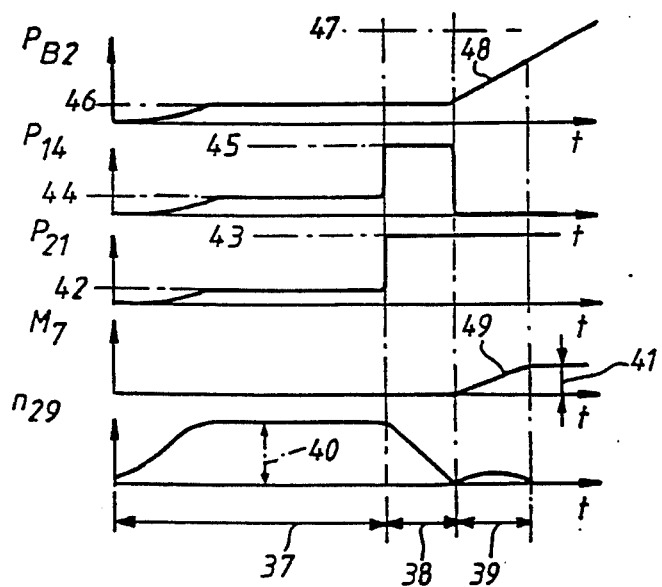
FIG. 2 shows a shifting table for the shift elements in the transmission of FIG. 1, selected in the individual gears and, according to the invention, in a neutral position.
FIG. 3 illustrates five timing diagrams which show a representation of the engagement operation according to one embodiment of the present invention in the case of the transmission of FIG. 1.

According to the shifting table of FIG. 2, in the fifth gear designed as top gear, the planet carrier 8 of the front transmission section 5 and the inner central gear wheel 20 of the rear transmission section 6 are driven at the drive speed of the drive motor, due to the engaged shifting clutches K2 and K4. The coupling shaft 26, connected to the outer central gear wheel 11, is driven to fast speed on account of the inner central gear wheel 10, stalled by the engaged shifting brake B1, so that the output shaft 7 likewise has a, even if smaller, step up to fast speed.

In the direct fourth gear, due to engagement of the shifting clutches K3 and K4, the front transmission section 5 goes around as a block at the speed of the drive motor, so that in the rear transmission section 6 the two central gear wheels 20 and 25, due to the engaged shifting clutch K2, and thus also the output shaft 7, are all also driven at the speed of the drive motor.

In third gear, the front transmission section 5 is still switched to block operation as in fourth gear, due to the engaged shifting clutches K3 and K4, so that the rear outer central gear wheel 25 is driven at the drive speed of the drive motor, and the rear inner central gear wheel 20 is stalled by the shifting brake B2. As a result, the output shaft 7 is driven to slow speed with the step down of the rear transmission section 6.

In second gear, compared with the higher gear, instead of the shifting clutch K4, the shifting brake B1 is then engaged, so that in the front transmission section 5 the larger inner central gear wheel 10 is stalled and the smaller inner central gear wheel 13 is driven at the speed of the turbine impeller 29. As a result, in this gear the step down of the rear transmission section 6 has multiplicatively superimposed on it the step down of the front transmission section 5, likewise leading to slow speed reduction.

In first gear, compared with the higher gear, instead of the shifting brake B1, the shifting brake B3 is engaged, so that the planet carrier 8 of the front transmission section 5 is stalled. As a result, the coupling shaft 26 is driven at slow speed compared with the drive speed of the turbine impeller 29 to a greater extent than in the higher gear. Here too, the step down of the rear transmission section 6, with stalled inner central gear wheel 20, has multiplicatively superimposed on it the partial step down of the front transmission 5 with stalled planet carrier 8.

In reverse gear, compared with first gear, instead of the shifting clutch K3, the shifting clutch K1 is engaged, so that the inner central gear wheel 10, meshing directly with the main planet 9, is driven at the turbine impeller speed, whereas the outer central gear wheel 11 is driven in the opposite direction of rotation at a slow speed. As a result, the other outer central gear wheel 25, and thus also the output shaft 7 are, with stalled inner central gear wheel 20, also driven in the opposite direction of rotation to the direction of rotation of the turbine. Again the step down of the rear transmission section 6 has multiplicatively superimposed on it the step down of the front transmission section 5.

Referring to FIG. 3, during an application Phase 37, when selecting the neutral position N prior to an engagement operation or when starting the drive motor in the neutral position, the shifting brake B3 of the front transmission section 5, involved in forming the first gear used as starting gear and the reverse gear R, is fully engaged, so that the planet carrier 8 is stalled. In the front transmission section 5, both the shifting clutch K3, involved in forming first gear, and the shifting clutch K1, involved in forming reverse gear R, continue to be applied by the working pressure $P_{21}$ and $P_{14}$ in the associated shift actuators 21 and 14 being brought to a respective application pressure value 42 and 44, respectively, although the idling speed value 40 of the turbine impeller speed $n_{29}$ is not, or not significantly, reduced. The shifting brake B2 of the rear transmission section 6 is also applied in this application phase 37, by control of the working pressure $P_{B2}$ to an application pressure 46 in the associated shift actuator, but only such that the output torque $M_7$ at the output shaft 7 is still zero.

Under these circumstances, when position D is selected, a first engagement phase 38 is initiated, in which the working pressure $P_{21}$ and $P_{14}$ in the shift actuators 21 and 14 is spontaneously increased to a respective load value 43 and 45, so that the front transmission section 5 is stalled as a single block and the turbine speed $n_{29}$ drops to zero. The output torque $M_7$ at the output shaft 7 in this case continues to remain zero. Also unaffected in this case is the working pressure $P_{B2}$ of the shifting brake B2 which remains at its application pressure value 46.

At the moment at which the turbine speed $n_{29}$ has become zero, a second engagement phase 39 is initiated, in which the working pressure $P_{14}$ in the shift actuator 14 of the shifting clutch K1, not required in the starting gear, is reduced to zero and the working pressure $P_{B2}$ in the shift actuator of the shifting brake B2 is raised smoothly or with a flat rise 48 to a load value 47, so that the output torque $M_7$ at the output shaft 7 also rises from zero with a jerk-free smooth progression 49 just to a low creeping torque 41 predetermined by the torque converter.

This smooth and relatively brief engagement operation also occurs when selecting reverse gear, because this operation proceeds in a way corresponding to the engagement operation for selecting first gear and differs from the latter only in that, in the second engagement phase 39, instead of the shifting clutch K1 now the shifting clutch K3 is disengaged, so that the output torque M7 is raised in the same way as described above by a gentle pressure increase in the shift actuator of the shifting brake B2 from zero to the low torque value 41.

The control of the speed change transmission may be designed in such a way that the same engagement operation occurs in the parking position, or when engaging a gear from the parking position, as when engaging from the neutral position.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An arrangement for an automatic shifting of an epicyclic, shiftable transmission of a motor vehicle, the transmission having transmission elements which are selective engaged by frictional shift elements operated by pressure medium actuators to form at least a forward starting gear and a reverse starting gear of the transmission, the arrangement including, in series in a power train:
   an input shaft which is driven from a drive motor;
   a first epicyclic transmission section;
   a second epicyclic transmission section;
   an output shaft which is coupled to vehicle wheels:
   an uninterruptible, torsionally rigid drive connection between a transmission element of the first transmission section and a transmission element of the second transmission section, the input shaft being in drive connection with the first transmission section when the transmission is in gear and the power train between the input shaft and the output shaft being interrupted when the transmission is in a neutral position, a single coupling shaft forming the torsionally rigid drive connection between the first and second transmission sections;
   means for initiating a first engagement phase when the transmission is in the neutral position and one of the starting gears is preselected in which a transmission element operating as a reaction in the preselected starting gear and at least one further transmission element of the first transmission section, which can be brought into drive connection with the input shaft, are stalled and the second transmission section, which is brought into drive connection with the output shaft is held in a driveless state; and
   means for initiating a second engagement phase when a speed of the input shaft approaches zero, in which both a transmission element of the second transmission section which operates as a reaction in the starting gear and is brought into drive connection with the output shaft is stalled and the torque transmissiblity between the input shaft and output shaft rises gently from zero with ending of the braked state of gear elements not operated as a reaction in the starting gear, by control of a working pressure in shift actuators involved in forming a step down of the starting gear.

2. An arrangement according to claim 1, wherein the starting gear to be preselected is the reverse gear of the transmission.

3. An arrangement according to claim 2, wherein the engagement phases are initiated by preselection even when the transmission is in a parking position.

4. An arrangement according to claim 3, wherein a hydrodynamic torque converter is arranged in the power train between the drive motor and the input shaft and the rise in the torque transmissibility is limited in the second engagement phase.

5. An arrangement according to claim 4, wherein the shift actuators subjected to working pressure in the first engagement phase are under an application pressure in an application phase initiated by selection of one of a neutral position N and a parking position.

6. An arrangement according to claim 5, wherein a hydrodynamic torque converter is arranged in the power train between the drive motor and the input shaft and the application pressure of the shift actuator of the shifting elements bringing the input shaft into drive connection with the associated first transmission section is limited such that an idling speed of the turbine impeller is not, or is only slightly, reduced.

7. An arrangement according to claim 6, wherein the initiation of the second engagement phase takes place in dependence on the operation of the service brake of the vehicle wheels.

8. An arrangement according to claim 7, wherein the initiation of the second engagement phase takes place in dependence on the operation of the accelerator pedal.

9. An arrangement according to claim 8, wherein in the first engagement phase, shift elements establishing the drive connection between the drive motor and the first transmission section in one of the starting gear and in the reverse gear are engaged.

* * * * *